United States Patent [19]

Lin

[11] Patent Number: 5,446,540

[45] Date of Patent: Aug. 29, 1995

[54] METHOD OF INSPECTING PHASE SHIFT MASKS EMPLOYING PHASE-ERROR ENHANCING

[75] Inventor: Burn J. Lin, Austin, Tex.

[73] Assignee: International Business Machines Corporation, Armonk, N.Y.

[21] Appl. No.: 968,745

[22] Filed: Oct. 30, 1992

[51] Int. Cl.⁶ .............................................. G01B 9/02
[52] U.S. Cl. .................................... 356/345; 359/370
[58] Field of Search ....................... 356/345, 351, 354; 359/370, 371, 386

[56] References Cited

U.S. PATENT DOCUMENTS

| | | | |
|---|---|---|---|
| 2,685,228 | 8/1954 | Kavanagh | 88/39 |
| 4,446,548 | 5/1984 | Bouwhuis et al. | 369/109 |
| 5,124,927 | 6/1992 | Hopewell et al. | 356/401 |
| 5,246,801 | 9/1993 | Pierrat | 430/5 |

FOREIGN PATENT DOCUMENTS

| | | |
|---|---|---|
| 1016752 | 4/1950 | France . |
| 335766 | 3/1977 | Germany . |
| 51019468 | 5/1993 | Japan . |
| 50027410 | 11/1993 | Japan . |

OTHER PUBLICATIONS

Lin, Burn J., "Phase-Shifting and Other Challenges in Optical Mask Technology" 10th Annual Symposium on Microlithography, SPIE vol. 1496, pp. 54–78, Sep. 26–27, 1990.
M. Born & E. Wolf, Principles of Optics, Pergamon Press, 3rd Edition, pp. 300–302, 424–428. 1964.

*Primary Examiner*—Samuel A. Turner
*Assistant Examiner*—Robert Kim
*Attorney, Agent, or Firm*—Graham S. Jones, II; Dale M. Crockatt

[57] ABSTRACT

A phase-contrast microscope with a quarter-wave plate in a pupil plane with a thickness of $\lambda\theta/2\pi$ is provided for the inspection of a phase-shifting mask. The angle $\theta$ and the wavelength $\lambda$ are adjustable to optimize the phase detection sensitivity. A similar $\theta$ and $\lambda$ optimization scheme is applied to an interference microscope assembly wherein an inspection beam is split into two beams by a beam splitter to be reflected by mirrors and then recombined at a second beam splitter. A mirror in one of the beams can be moved to change $\theta$ to its optimum value at a given $\lambda$ which can be changed by light source selection or by filter change.

2 Claims, 2 Drawing Sheets

METHOD OF INSPECTING PHASE SHIFT MASKS EMPLOYING PHASE-ERROR ENHANCING

BACKGROUND OF THE INVENTION

1. Field of the Invention

This invention relates to methods for inspecting phase-shifting masks for photolithography, and more particularly to phase-error enhancement by inspection.

2. Description of Related Art

The phase-shifting mask technique has been shown to improve the imaging performance of optical imaging systems, as described in B. J. Lin, Proceedings of the 10th Annual Symposium on Microlithography, pp. 54–79, SPIE vol. 1496, September 1990. However, several problems have to be overcome to facilitate manufacturing applications. One of the key problems is to inspect the phase-shifting mask (PSM) for possible patterning or phase shifting errors. While many phase shifter errors in the lateral dimension can be readily inspected with existing inspection equipments for conventional intensity masks because of the existence of a boundary, phase errors are difficult to inspect. In principle, phase-contrast microscopy as described in M. Born and E. Wolf, "Principles of Optics" Pergamon Press, 3rd Ed., pages 300, 424, (1964) turns phase variations into intensity distributions; thus, rendering quantitative evaluation possible. Most phase shifting masks call for a $\pi$ phase shift to maximize the imaging improvement but the $\pi$ phase shift is not the optimum phase shift for phase error detection. By employing the method of this invention, applicant has discovered that a predetermined optimum wavelength for phase error detection can be employed.

Further in accordance with this invention, the wavelength does need not need to be changed, but an optimum inspection phase shifting angle can be used for a given phase shifting angle to be inspected.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1:
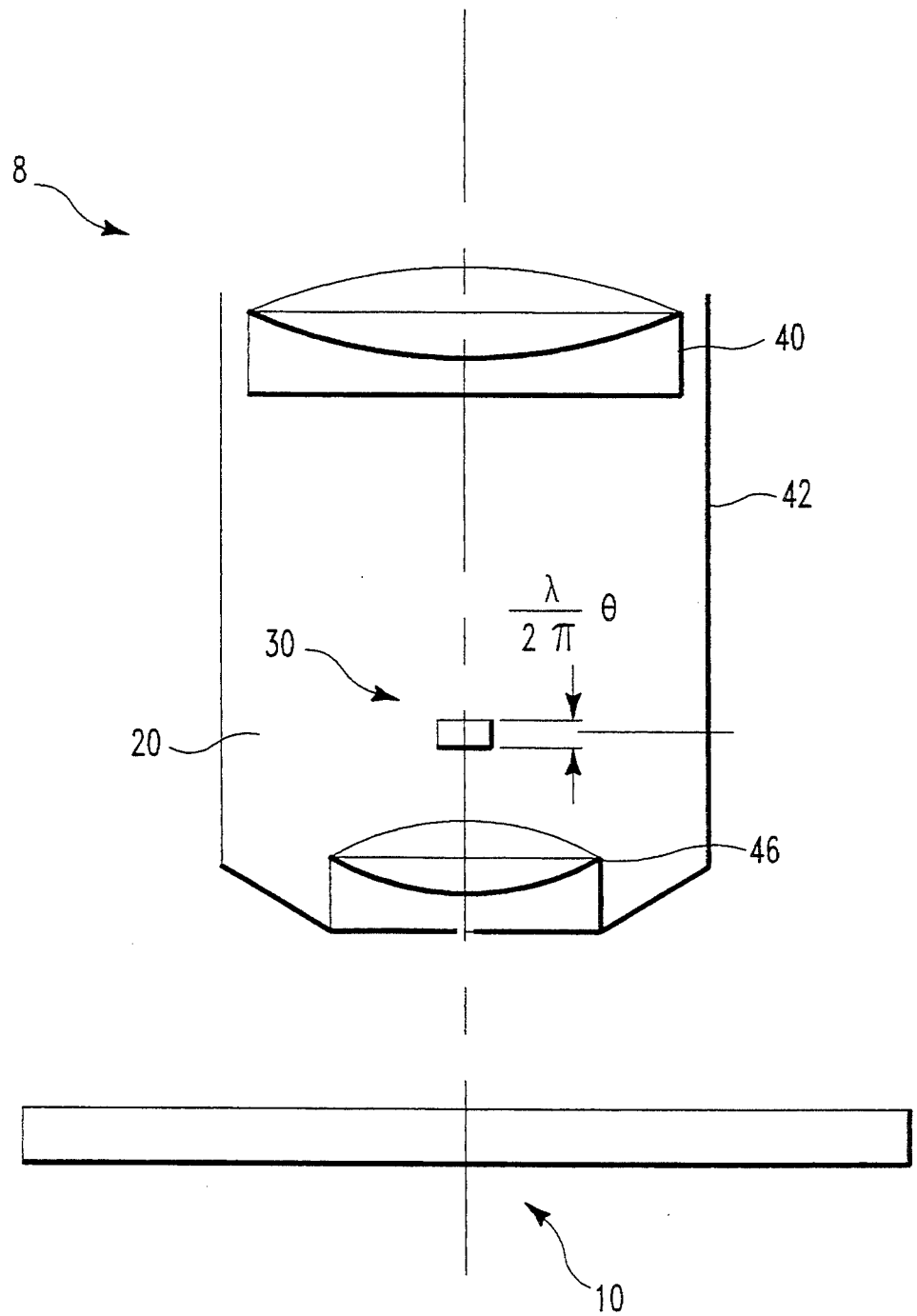
FIG. 1 shows a phase contrast microscope illustrating a first embodiment of this invention.

This invention provides a phase-error enhancing technique for better inspection. The sensitivity of phase error is enhanced to facilitate detection of errors when inspecting phase shifting masks.

A discussion of phase error detection sensitivity as it applies to this invention follows. The intensity of a phase-contrast image is given by, $$I(\phi) = E(\phi)^* E(\phi). \quad [1]$$

The function $E(\phi)$ is derived by taking the electric field distribution on the mask, $$F(x) = e^{i\phi(x)}, \quad [2]$$

separate the zeroth order component, $$F(x) = 1 + (e^{i\phi(x)} - 1) \quad [3]$$

then, add a $\lambda/4$ phase shift to the zeroth order component to perform the phase-contrast operation, $$E(\phi) = e^{i\pi/2} + (e^{i\phi} - 1) = \sqrt{2}\, e^{-i3\pi/4} + e^{i\phi}. \quad [4]$$

The phase-contrast intensity becomes $$I(\phi) = E(\phi) = 3 + 2\sqrt{2}\, \cos(\phi + 3\pi/4). \quad [5]$$

The sensitivity of the phase-contrast intensity change as a function of the phase shift change is $$\frac{dI}{d\phi} = -2\sqrt{2}\, \sin(\phi + 3\pi/4). \quad [6]$$

To maximize the detection sensitivity, $\phi + 3\pi/4$ has to be odd multiples of $\pm \pi/2$. Thus, $$\phi_{optimum} = (4m-1)\pi/4 \quad [7]$$

where $m = 0, \pm 1, \pm 2, \ldots$ $$\phi_{optimum} = -5\pi/4, -\pi/4, 3\pi/4, 7\pi/4, \ldots \quad [8]$$

The gain in detection sensitivity is shown as follows: If $\phi = \pi$, as in most phase shifting masks, $dI/d\phi = 2$ which is 40% smaller than when $\phi$ is at one of its optimum values, $$dI/d\phi_{optimum} = 2\sqrt{2}. \quad [9]$$

This invention shows a way to change $\phi$ to the optimum value for inspection while keeping it at $\pi$ for best phase shifted imaging. It takes advantage of a reduction of phase shift $\phi$ by an increase of the inspection wavelength from $\lambda$ to $\lambda'$ while keeping the imaging phase shifting wavelength at $\lambda$. If the refractive index of the phase shifting material remains constant, an increase of the wavelength $\lambda$ to wavelength $\lambda'$ reduces the amount of phase shift from $\phi$ to $\phi'$.

Therefore, $\lambda$ can be set to $\phi_{optimum}$ by making $$\lambda_{optimum} = \lambda' = \lambda \frac{\phi}{\phi_{optimum}}.$$

Even if the refractive index changes at the new wavelength $\lambda'$, the latter can be fine tuned to achieve the optimum operating point. The new wavelength $\lambda'$ will now be chosen according to, $$\lambda' = \lambda \frac{\phi}{\phi_{optimum}} \cdot \frac{n}{n'} \quad [10]$$

The wavelength can either be increased or decreased to achieve $\phi_{optimum}$ according to Eq. 10.

Alternately, the phase shift $\theta$ applied to the zeroth order beam in phase-contrast microscopy can be adjusted instead of changing the inspection wavelength $\lambda$. Let us generalize Eq.4 to allow a shift of $\theta$ instead of $\lambda/4$ in the zeroth order beam.

$$E(\phi) = e^{i\theta} + (e^{i\phi} - 1). \quad [11]$$

Equation 5 becomes, $$I = 3 + 2\{\cos(\theta - \phi) - \cos\theta - \cos\phi\}. \quad [12]$$

$$\frac{dI}{d\phi} = 2\{\sin\phi - \sin(\theta - \phi)\}. \quad [13]$$

$$\theta_{optimum} = 2\phi - (1 \pm 2m)\pi \quad [14]$$

where m=0,1,2, . . . . Therefore, the wavelength can remain unchanged. Maximum detection sensitivity can be achieved by setting the shift of the zeroth order inspection beam to $\theta_{optimum}$.

Furthermore, when the wavelength λ is set at the desirable wavelength for the illumination source, detection optics, and detector, then θ can be set to provide the highest detection sensitivity.

Though optimum points of operation are desirable. The spirit of the invention can be exercised at slightly off optimum operation points.

FIG. 1 shows a phase-contrast microscope 8 which is an exemplary embodiment of this invention. Other phase detection schemes can also benefit similarly. In FIG. 1, are shown a phase-shifting mask 10, and the microscope 8 including among other elements a quarter-wave plate 30 in pupil plane 20. The thickness of the plate 30 is λθ/2π. FIG. 1 shows a typical phase contrast objective 42 consisting of elements 40 and 46 of a compound lens and the phase-shifting plate 30 for the zeroth-order beam. The angle θ and the wavelength λ are now adjustable according to the spirit of this invention.

Figure 2:
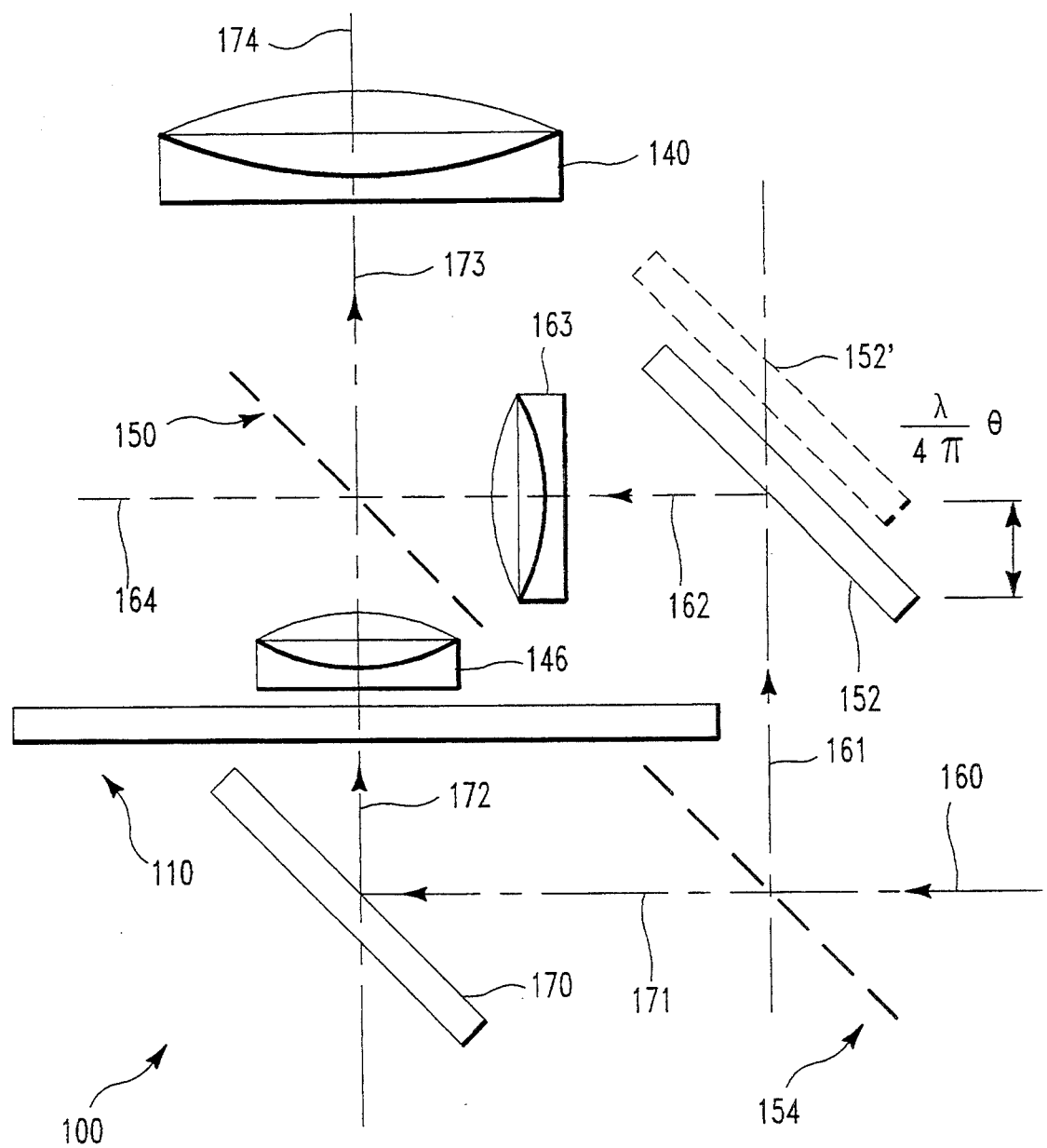
FIG. 2 shows an interferometer illustrating a second embodiment of this invention.

FIG. 2 shows the spirit of the invention applied to an interference microscope assembly. The inspection beam 160 is split into beams 161 and 171 by beam splitter 154 to be reflected by mirrors 152 and 170, then recombined at the second beam splitter 150. Lenses 163 and 140 form a compound objective lens for the split beam 162. Lenses 146 and 140 form another compound objective lens for the other split beam 172. Mirror 152 can be moved to change θ to its optimum value, as indicated by phantom mirror 152'. The wavelength λ can be changed by light source selection or change of the filter to its optimum value.

In the case of the interferometer of FIG. 2, the reference arm has a phase shift of θ and the PSM has a phase shift of φ. The optimum inspection phase shift $\theta_{optimum}$ is calculated as follows:

$$I = E^*E = (e^{-i\theta} + e^{-i\phi})(e^{i\theta} + e^{i\phi}) = 2 + 2\cos(\theta - \phi) \quad [15]$$

where φ is the phase shifting angle in the phase shifting mask and is usually required to be π at the imaging wavelength as before.

Here, $$\frac{dI}{d\phi} = 2\sin(\phi - \theta). \quad [16]$$

$$\theta_{optimum} = \phi + (2m - 1)\pi/2 \quad [17]$$

where m = 0,1,2, . . .

While this invention has been described in terms of the above embodiment(s), those skilled in the art will recognize that the invention can be practiced with modifications within the spirit and scope of the appended claims.

Having thus described the invention, what is claimed as new and desirable and desired to be secured by Letters Patent is as follows:

1. A method for inspecting a phase-shifting mask for photolithography, comprising the steps of:
   (a) obtaining a phase shifting mask inspection microscope having a phase contrast objective, and further having an adjustable phase shifter capable of phase shifting the zeroth order light by θ;
   (b) adjusting said adjustable phase shifter to phase shift the zeroth order light by θ to enhance the detection of a phase error in the phase-shifting mask, wherein θ is a predetermined value according to:

$$\theta = 2\phi - (1 \pm 2m)\pi$$

where φ is the phase shift of a mask element being inspected, m is an integer, and π is the mathematical constant pi; and
   (c) subsequently using the microscope to inspect the phase-shifting mask.

2. A method for inspecting a phase-shifting mask for photolithography, comprising the steps of:
   (a) obtaining a phase shifting mask inspection microscope having an interference objective, and further having an adjustable phase shifter capable of phase shifting the reference light by θ;
   (b) adjusting said adjustable phase shifter to phase shift the reference light by θ to enhance the detection of a phase error in the phase-shifting mask, wherein θ is predetermined value according to:

$$\theta = 2\phi - (1 \pm 2m)\pi$$

where φ is the phase shift of a mask element being inspected, m is an integer, and π is the mathematical constant pi; and
   (c) subsequently using the microscope to inspect the phase-shifting mask.

* * * * *